United States Patent Office 3,513,195
Patented May 19, 1970

3,513,195
PRODUCTION OF 2,2-DIMETHYLSUCCINIC ACID
Helmuth Hagen, Ludwigshafen (Rhine), and Friedrich Becke, Heidelberg, Germany, assignors to Badische Anilin- & Soda-Fabrik Aktiengesellschaft, Ludwigshafen (Rhine), Rhineland, Pfalz, Germany
No Drawing. Filed Nov. 28, 1967, Ser. No. 686,354
Claims priority, application Germany, Dec. 1, 1966, 1,568,210
Int. Cl. C07c 55/02, 69/40
U.S. Cl. 260—537
8 Claims

ABSTRACT OF THE DISCLOSURE

Production of 2,2-dimethylsuccinic acid by reaction of methallyl chloride or methallyl bromide with two equivalents of an alkali or alkaline earth metal cyanide in the presence of about one equivalent of alkali or alkaline earth metal hydroxide and about three moles of water per mole of methallyl chloride or bromide at temperatures of 50° to 200° C., and recovering the free 2,2-dimethylsuccinic acid in the conventional way by adding strong mineral acid. 2,2-dimethylsuccinic acid may be reacted with diols to produce polyester resins.

This invention relates to a method of preparing 2,2-dimethylsuccinic acid from methallyl chloride or methallyl bromide.

It is known from J. Chem. Soc., 121, 53 (1922) that 2,2-dimethylsuccinic acid is obtained by reaction of $\beta,\beta$-dimethylacrylic esters with potassium cyanide followed by hydrolysis. Yields of only 30% of the theory are however achieved by this method. According to another process described in loc. cit., 130, 2020 (1928), 2,2-dimethylsuccinic acid is obtained by reaction of ethyl-$\alpha$-cyano-$\beta,\beta$-dimethyl acrylate with potassium cyanide followed by hydrolysis. This process has the disadvantage that difficultly accessible starting materials have to be used. Moreover it is known from J. Chem. Soc., 121, 157 (1922) that 2,2-dimethylsuccinic acid is obtained by oxidation of 5,5-dimethylcyclopenten-(1)-ol-(3)-one-(2) with a hypochlorite. Finally, 2,2-dimethylsuccinic acid may be obtained according to a method described in Ber., 54, 586 (1921) by oxidation of $\beta,\beta$-dimethylbutyrolactone with a bichromate and sulfuric acid. In this last-mentioned method it is also necessary to start from difficultly accessible starting materials.

It is an object of this invention to provide a process by which 2,2-dimethylsuccinic acid is obtained in good yields. Another object of the invention is to provide a process by which 2,2-dimethylsuccinic acid is prepared from readily accessible starting materials.

In accordance with this invention these and other objects and advantages are achieved in a process for the production of 2,2-dimethylsuccinic acid which comprises reacting methallyl chloride or methallyl bromide with two equivalents of an alkali metal cyanide or an alkaline earth metal cyanide in the presence of about one equivalent of an alkali metal hydroxide or an alkaline earth metal hydroxide and about three moles of water per mole of methallyl chloride or methallyl bromide at a temperature of 50° to 200° C., and recovering the free 2,2-dimethylsuccinic acid in known manner by adding strong mineral acids.

The reaction of methallyl chloride with sodium cyanide and sodium hydroxide may be illustrated by the following equation:

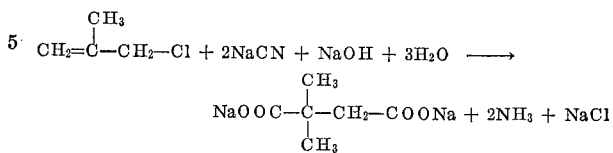

The new process is remarkable in that it is stated in German patent specification No. 845,517 that the product obtained in the reaction of methallyl chloride with alkali metal cyanides in aqueous alcohol solution is $\beta,\beta$-dimethylacrylonitrile.

The starting materials used are methallyl chloride or methallyl bromide which are easily obtained by chlorination or bromination of isobutylene. Methallyl chloride is preferred for technical reasons. The prefered alkali metal cyanides and alkaline earth metal cyanides are sodium cyanide, potassium cyanide, calcium cyanide and barium cyanide. The reaction is particularly successful with potassium cyanide or sodium cyanide.

Two equivalents of alkali metal cyanide or alkaline earth metal cyanide are used per mole of methallyl chloride or methallyl bromide. It is advantageous to use the alkali metal cyanide or alkaline earth metal cyanide in an excess, for example of up to 10 mole percent.

The reaction is carried out in the presence of alkalies. Preferred alkalies are hydroxides of metals of Groups I-A and II-A of the Periodic System, such as sodium hydroxide, potassium hydroxide, calcium hydroxide or barium hydroxide. It is particularly preferred to use sodium hydroxide or potassium hydroxide. It is advantageous to use at least one equivalent of an alkali metal hydroxide or alkaline earth metal hydroxide per mole of methallyl chloride or methallyl bromide. It is also possible to add the alkali metal hydroxide or alkaline earth metal hydroxide in excess, for example up to 20 mole percent.

The reaction is advantageously carried out at a temperature of from 50° to 200° C. Particularly good results are obtained at temperatures of from 70° to 180° C. In general the reaction is carried out without the use of increased pressure. It is possible however to carry out the reaction at pressures up to 50 atmospheres provided temperatures are used which lie above the boiling point of the substance used. It is advantageous to allow the ammonia formed to leave the pressure vessel in this case through a constant pressure valve.

The reaction is carried out in the presence of water. It is advantageous to use about 3 moles of water per mole of methallyl chloride or methallyl bromide. Since water is often used as a solvent, it is usually present in excess. Organic substances which are miscible with water may also be used as solvents, such as alcohols having one to four carbon atoms or water-soluble ethers, for example tetrahydrofuran or glycol dimethyl ether.

2,2-dimethylsuccinic acid is obtained from the salts of 2,2-dimethylsuccinic acid formed in the reaction in a conventional manner by reaction with strong mineral acids. Hydrochloric acid and sulfuric acid are particularly suitable. It is advantageous to use at least two equivalents of mineral acid per mole of methallyl chloride or methallyl bromide.

The process according to the invention may be carried out for example by adding the specified amount of methallyl chloride or methallyl bromide to a solution of an alkali metal cyanide or an alkaline earth metal cyanide in water and in one of the said solvents at the said temperatures.

As soon as ammonia is evolved, the specified amount of alkali is allowed to flow in, the temperature advantageously being raised to above 100° C. The reaction is in general over after five to fifteen hours. An excess of mineral acid is then added to the reaction solution, which is allowed to cool. The 2,2-dimethylsuccinic acid which has separated out is then isolated in known manner by filtration.

The 2,2-dimethylsuccinic acid prepared by the process according to this invention is suitable for the production of high polymers.

If 1 mole of 2,2-dimethylsuccinic acid be heated with 1 mole of butanediol-(1,4) in vacuo from 50° to 150° C. in the course of thirty-six hours, a polyester is obtained. The bis-(2-ethylhexyl)ester of 2,2-succinic acid is suitable like the corresponding phthalic esters as a plasticizer for polyvinyl chloride.

The following example will further illustrate the invention.

Example 364 parts of methallyl chloride is allowed to flow into a solution of 400 parts of sodium cyanide in 300 parts of water and 500 parts of methanol at 65° to 70° C. in a stirred apparatus. When all has been added, the solution is heated for about another two hours at the boiling temperature. The temperature is then raised to about 90° to 100° C. As vigorous evolution of ammonia begins, 1200 parts of 20% by weight caustic soda solution is allowed to flow in slowly. The reaction mixture is heated at about 110° C. until the evolution of ammonia has subsided, and then cooled. The product is acidified with 50% hydrochlorid acid. Dimethylsuccinic acid is deposited in the form of colorless crystals. The crystal mash is suction filtered, washed with cold water and dried. 510 parts of 2,2-dimethylsuccinic acid having a melting point of 142° to 143° C. is obtained. This is equivalent to a yield of 87% of the theory.

We claim:
1. A process for the production of 2,2-dimethylsuccinic acid which comprises reacting methallyl chloride or methallyl bromide with two equivalents of an alkali metal cyanide or an alkaline earth metal cyanide in the presence of about one equivalent of an alkali metal hydroxide or alkaline earth metal hydroxide and about three moles of water per mole of methallyl chloride or methallyl bromide at a temperature of from 50° to 200° C., and recovering the free 2,2-dimethylsuccinic acid by adding strong mineral acid.

2. A proces as claimed in claim 1 in which methallyl chloride is used as the starting material.

3. A process as claimed in claim 1 in which sodium cyanide is used.

4. A proces as claimed in claim 1 in which potassium cyanide is used.

5. A process as claimed in claim 1 in which the cyanide is used in an excess of up to 10 mole percent.

6. A process as claimed in claim 1 carried out at a temperature of 70° to 180° C.

7. A process as claimed in claim 1 in which water in excess is used as the solvent.

8. A process as claimed in claim 1 carried out at superatmospheric pressure up to 50 atmospheres.

References Cited

UNITED STATES PATENTS

| | | | |
|---|---|---|---|
| 2,351,667 | 6/1944 | Dean et al. | 260—537 |
| 2,623,882 | 12/1952 | Meyer | 260—537 |

LORRAINE A. WEINBERGER, Primary Examiner

V. GARNER, Assistant Examiner

U.S. Cl. X.R.

260—485, 31.6